(12) United States Patent
Warren et al.

(10) Patent No.: US 6,446,522 B1
(45) Date of Patent: Sep. 10, 2002

(54) AUTOMATED TRANSMISSION SYSTEMS

(75) Inventors: Robin John Warren, Leamington Spa; Richard Brian Moseley; James Anthony Lethbridge, both of Warwickshire, all of (GB)

(73) Assignee: LuK Lamellen und Kupplungsbau GmbH, Buhl/Baden (DE)

( * ) Notice: Subject to any disclaimer, the term of this patent is extended or adjusted under 35 U.S.C. 154(b) by 0 days.

(21) Appl. No.: 09/658,852

(22) Filed: Sep. 11, 2000

(30) Foreign Application Priority Data

Sep. 11, 1999 (GB) .............................................. 9921428

(51) Int. Cl.$^7$ .............................................. F16H 63/28
(52) U.S. Cl. ........................ 74/335; 477/906; 192/3.62
(58) Field of Search .............................. 74/335; 477/79, 477/906; 192/3.57, 3.63, 3.62

(56) References Cited

U.S. PATENT DOCUMENTS

| | | | |
|---|---|---|---|
| 4,601,369 A | * 7/1986 | Hattori et al. | 192/3.58 |
| 5,038,901 A | * 8/1991 | Parsons et al. | 192/3.55 |
| 5,377,797 A | * 1/1995 | Mustapha et al. | 192/3.55 |
| 5,473,959 A | * 12/1995 | Lasoen | 74/335 |
| 5,626,534 A | * 5/1997 | Ashley et al. | 477/79 |
| 5,992,590 A | * 11/1999 | Harries | 192/3.58 |

FOREIGN PATENT DOCUMENTS

| | | |
|---|---|---|
| DE | 1 9504847 | 9/1995 |
| DE | 19734023 | 2/1998 |
| EP | 0038113 | 10/1981 |
| EP | 0043660 | 9/1982 |
| EP | 0059035 | 9/1982 |
| EP | 069341 | 1/1983 |
| EP | 0101220 | 2/1984 |
| EP | 0735957 | 10/1996 |
| WO | WO 92/13208 | 8/1992 |
| WO | WO 9705410 | 2/1997 |
| WO | WO 97/10456 | 3/1997 |

* cited by examiner

Primary Examiner—Charles A. Marmor
Assistant Examiner—Ha Ho
(74) Attorney, Agent, or Firm—Darby & Darby

(57) ABSTRACT

An automated multi-ratio transmission has a gear-engaging mechanism with a first actuator to move a selector member in a first direction to select a gear ratio, and a second actuator to move the selector member in a second direction to engage the selected gear ratio. The vehicle may be started from stand-still in either a forward or reverse start-up gear ratio, both of which are engaged from an end position of the range of movement of the selector member. In the start-up phase of the vehicle, an automated control means drives the first actuator to the appropriate selector position for either the forward or reverse start-up gear and then drives the second actuator to engage the desired start-up gear.

14 Claims, 3 Drawing Sheets

AUTOMATED TRANSMISSION SYSTEMS

BACKGROUND OF THE INVENTION

The present invention relates to automated or semi-automated transmission systems with a multi-ratio transmission and a gear-engaging mechanism for engaging the ratio at which the transmission is to operate.

In semi-automated and fully automated transmission systems, the gear ratio for setting the vehicle in motion from stand-still is in many operating situations selected automatically after the drive-mode lever has been moved. In fully automated transmissions, the selection of the gear ratio may be performed automatically by a control unit, so that no intervention by the driver is required at least in one operating mode of the transmission. The transmission can also have another operating mode in which the gear-ratio selection can be set by the driver. In transmission systems with an automated clutch, however, the take-off gear ratio is selected manually by moving the drive-mode lever.

The gear-engaging mechanism may be based on a conventional manual selector mechanism which, as a rule, has a selector member that is engageable with three shift rails. The selector member is moved in a first direction to engage one of the shift rails and in a second direction to move the engaged shift rail to actuate a gear. The shift rails normally control two gear ratios, movement of the shift rail in one direction engaging one gear ratio and movement of the shift rail in the opposite direction engaging the other gear ratio.

The automatic gear-engaging mechanism of the present invention has a pair of actuators. One actuator serves to move the selector member in the first direction, and the other actuator serves to move the selector member in the second direction. The actuators may be, for example, pneumatic or hydraulic cylinders or electric motors.

In accordance with International Patent Specification WO97/05410, the contents of which are hereby expressly incorporated by reference in the present disclosure, a pair of double-acting hydraulic cylinders are used to move the selector member; in an X-direction to engage an appropriate shift rail; and in a Y-direction to move the shift rail to engage gear. A pair of potentiometers are associated, respectively, with each of the actuators to sense a position of the actuator. The actuators are controlled by a closed-loop control circuit by means of feedback from the potentiometers to move the actuators to predetermined positions for each gear ratio of the transmission.

With systems of this type, a malfunction of one or both potentiometers may prevent the engagement of an appropriate gear ratio. Failure of the position-measuring potentiometer or the associated wiring can be detected if the measurement falls outside the normal range of operation. Normally, the interfacing circuit between the potentiometers and the electronic control unit will generate a voltage outside the normal potentiometer range in the event of an open-circuit failure of any one of the connections between the electronic control unit and potentiometer. The ranges outside the normal range of operation are referred to as guard bands.

It is, however, more difficult to detect a potentiometer failure in a case where the interface circuit generates a voltage within the normal operating range. This failure mode may result from increased resistance of the potentiometer track and the wiper. It is possible to detect failures of this type while the vehicle is in motion if it is possible to determine which gear is engaged based on a comparison of the vehicle speed and engine speed, if there is no clutch slippage. The actual position indicated by the potentiometers may thus be checked against the predetermined position of the potentiometers for the gear engaged.

However, when taking off from stand-still with the transmission system automatically selecting a start-up gear, typically first, second or reverse, it is not possible to check the potentiometers in this manner. Thus, if a potentiometer fails at start-up, it is possible in extreme circumstances that reverse gear ("R") may be selected instead of first gear or vice versa. This may result in a potentially hazardous situation if the vehicle starts off in the opposite direction to that expected.

OBJECT OF THE INVENTION

It is therefore the object of the present invention to solve the aforementioned problem inherent in state-of-the-art transmission systems of the kind described above.

SUMMARY OF THE INVENTION

According to one aspect of the present invention, the foregoing problem is solved for the case of an automated transmission system with a multi-ratio transmission and a gear-engaging mechanism. The latter has a selector member and a pair of actuators, subsequently referred to as first and second actuator. The first actuator serves to move the selector member in a first direction to select a gear ratio, and the second actuator serves to move the selector member in a second direction to bring the selected gear ratio into engagement. Each actuator is equipped with a position sensing means to provide a position signal corresponding to the gear ratio engaged. The transmission has forward and reverse start-up gears in which the vehicle may be started from stand-still. The position of the selector member at which the start-up gears are selected is located at the end positions of the range of movement of the selector member. The transmission system also includes a control means to automatically select a start-up gear to start the vehicle from stand-still. In the start-up phase of the vehicle, the control means drives the first actuator to the end position of the range of selector movement that corresponds to the location of the selected start-up gear and then drives the second actuator within its range of movement in the direction corresponding to the engagement of the selected start-up gear.

In accordance with the present invention, the start-up gear can be engaged without being referenced to the predetermined start-up gear position. The actual position indicated by the position-sensing means when the start-up gear is engaged in the manner described above may then be compared to the predetermined position. If a discrepancy is found in this comparison, this would indicate a failure condition in one or both position-sensing means. Start-up from stand-still may then be inhibited if a malfunction is detected in this manner.

In a practical embodiment of the invention, the control means is configured such that, at start-up from stand-still, the control means will drive the first and second actuators for a predetermined time period towards end positions of their respective movement ranges in a direction corresponding to the selected start-up gear.

It is preferred if one end position of the range of movement of the selector member in the direction controlled by the first actuator corresponds to the first and second gear ratios and the opposite end position of the range of movement corresponds to reverse gear.

In a preferred configuration of the control means, when a start-up gear has been selected, the control means will compare actual position signals delivered by the position-sensing means to predetermined position data and, if a discrepancy is found between the actual position signals and the predetermined position data, the control means will inhibit start-up from stand-still.

Further in the aforementioned preferred configuration of the control means, if a discrepancy is found between the actual position signals and the predetermined position data, the control means will register a failure condition.

In another preferred embodiment, the control means is configured such that, if a discrepancy is found between the actual position signals and the predetermined position data in the direction controlled by the second actuator, the control means will make further attempts to bring the selected start-up gear into engagement, before the control means will proceed to register a failure condition and/or inhibit start-up from stand-still.

It is of practical benefit if the position-sensing means includes a potentiometer.

In a preferred embodiment of the invention, once the vehicle is in motion, the control means will control engagement and disengagement of the gear ratios by using feedback coming from the position-sensing means through a closed-loop control system.

In a further development of the embodiment just mentioned, once the vehicle is in motion, the control means will perform a comparison between engine speed and vehicle speed and thereby determine which of the gear ratios is engaged. If a discrepancy is found between the actual position signals and the predetermined position data for the gear ratio engaged, the control means will register a failure condition.

In another preferred embodiment, if a position sensor generates a position signal which is out of the normal range of movement of the selector mechanism, the control means will register a failure condition.

Under an advantageous concept of the invention, the control means will inhibit the vehicle from starting up from stand-still if the control means has registered a failure condition.

With preference, the actuators are pneumatic or hydraulic actuators.

It is advantageous if during start-up from stand-still, the control means will reduce the pressure level supplied to the actuators in order to avoid damage to the selector member.

In a further advantageous embodiment of the invention, the actuators are electric motors.

In the embodiment just mentioned, it is advantageous if, during start-up from stand-still, the control means reduce the energizing current to the electric motors in order to avoid damage to the selector member.

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWINGS

The invention is now described, by way of example only, with reference to the accompanying drawings in which.

DETAILED DESCRIPTION OF THE INVENTION

Figure 1:
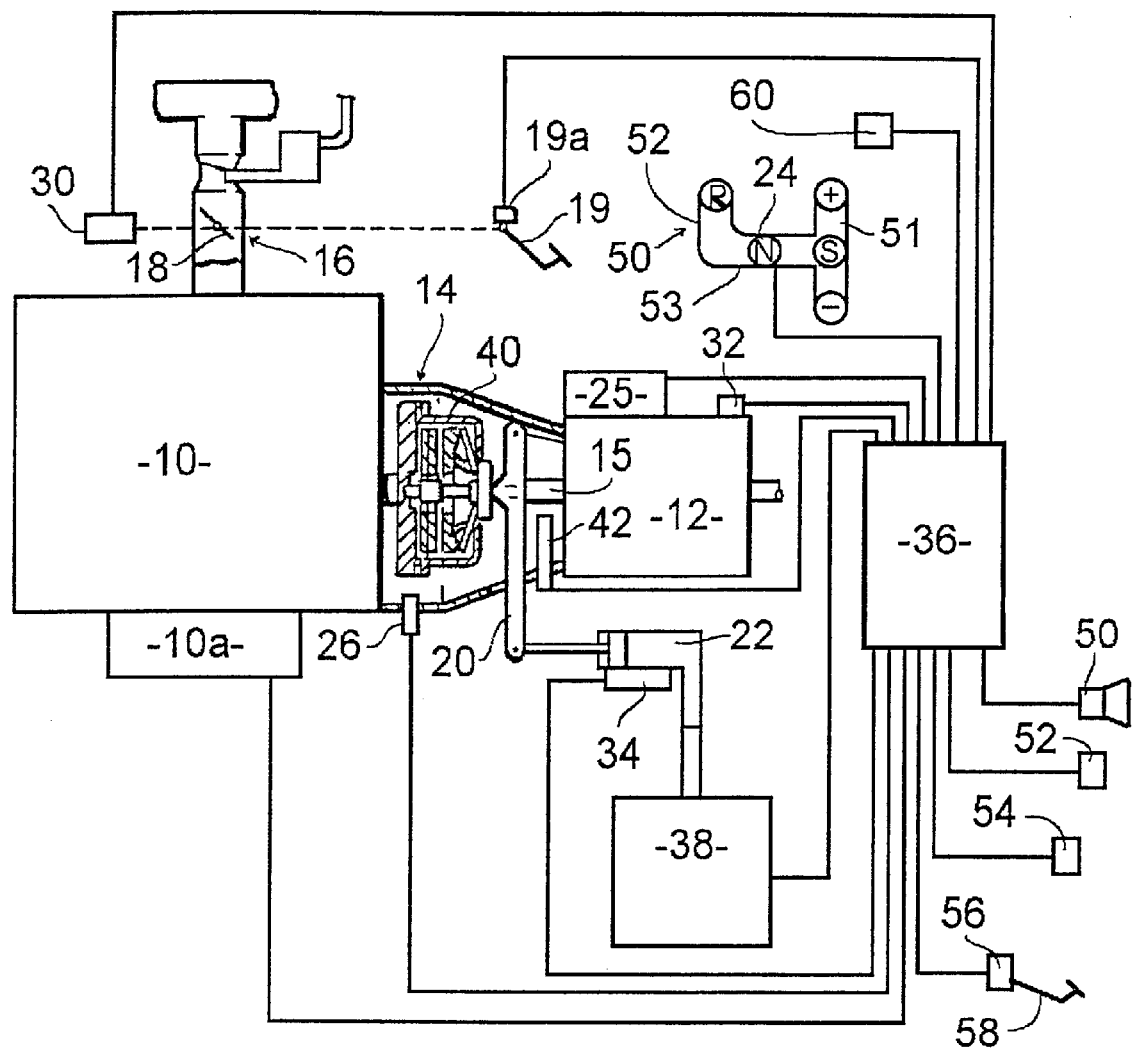
FIG. 1 illustrates an automated transmission system in accordance with the present invention.

FIG. 1 of the accompanying drawings shows an engine 10 with a starter and associated starter circuit 10a that is coupled through the main-drive friction clutch 14 to the transmission input shaft 15 of a multi-speed synchronized transmission 12 with countershaft. Fuel is supplied to the engine by a throttle 16 with a throttle valve 18 operated by accelerator pedal 19. The invention is equally applicable to gasoline or diesel engines with electronic or mechanical fuel injection.

The clutch 14 is actuated by a release fork 20 which is operated by a hydraulic slave cylinder 22 under the control of a clutch-actuator control means 38.

A gear-selector lever 24 operates in a shift track 50 with two legs 51 and 52 joined by a cross track 53 extending between the end of leg 52 and the midpoint of leg 51. The shift track 50 defines five positions; "R" at the end of leg 52; "N" intermediate of the ends of the cross track 53; "S" at the junction of leg 51 with the cross track 53; and "+" and "–" at the extremities of leg 51. In leg 51 the lever 24 is biased to the central "S" position. The "N" position of the selector lever 24 corresponds to neutral; "R" corresponds to reverse gear; "S" corresponds to a forward drive mode; momentary movement of the lever to the "+" position will cause the transmission to shift up one gear level; and momentary movement of the gear lever 24 to the "–" position will cause the transmission to shift down one gear level.

The positions of the lever 24 are sensed by a series of sensors, for example micro switches or optical sensors, positioned around the shift track 50. Signals from the sensors are fed to an electronic control unit 36. An output from the control unit 36 controls a gear-engaging mechanism 25, which engages the gear ratios of the transmission 12 in accordance with movement of the selector lever 24 by the vehicle operator. The gear-engaging mechanism 25 may, for example, comprise hydraulic cylinders and solenoid control valves to move selector members to engage and disengage the various gear ratios, for example as disclosed in patent specification WO97/05410 the contents of which are expressly incorporated by reference in the present disclosure.

In addition to signals from the gear selector lever 24, the control unit 36 receives signals from sensor 19a indicative of the degree of depression of the accelerator pedal 19; from sensor 34 indicative of the degree of opening of the throttle-control valve 18; from sensor 26 indicative of the engine speed; from sensor 42 indicative of the speed of the clutch driven plate; from sensor 34 indicative of the clutch slave cylinder position; and from sensor 32 indicative of the gear ratio selected.

The control unit 36 utilizes the signals from these sensors to control actuation of the clutch 14 during start-up from stand-still and during gear changes, for example as described in patent specifications EP0038113, EP0043660, EP0059035, EP0101220 and WO92/13208, the contents of which are expressly incorporated by reference in the present disclosure.

In addition to the abovementioned sensors, the control unit 36 also receives signals from a vehicle speed sensor 52, an ignition switch 54 and a brake switch 56 associated with the main braking system, for example the foot brake 58 of the vehicle.

A buzzer 50 is connected to the control unit 36 to warn or inform the vehicle operator of the occurrence of certain operating conditions. In addition to or in place of the buzzer 50, a flashing warning light or other indicating means may be used. A gear indicator 60 is also provided to indicate the gear ratio selected.

With the system described above, when the engine 10 is started by actuating the ignition switch 54 while the vehicle is standing still, the transmission system is activated, and the control unit 36 causes the clutch-actuating means 38, 22, 20 to disengage the clutch 14. Moving the shift lever 24 from the neutral position "N" to the drive position "S" or the reverse position "R" will have the effect that the control unit 36 causes the gear-engaging mechanism 25 to engage either the lowest forward gear (first gear) or the reverse gear. As the accelerator pedal 19 is depressed for take-off, the control unit 36 will address the clutch-actuating means 38, 22, 20 to re-engage the clutch 14 and thereby set the vehicle in motion. The re-engagement of the clutch 14 in this manner is controlled by control unit 36 as disclosed, e.g., in EP0038113; EP0043660; EP0696341, or EP0735957, the contents of which are hereby expressly incorporated by reference in the present disclosure.

Figure 2:
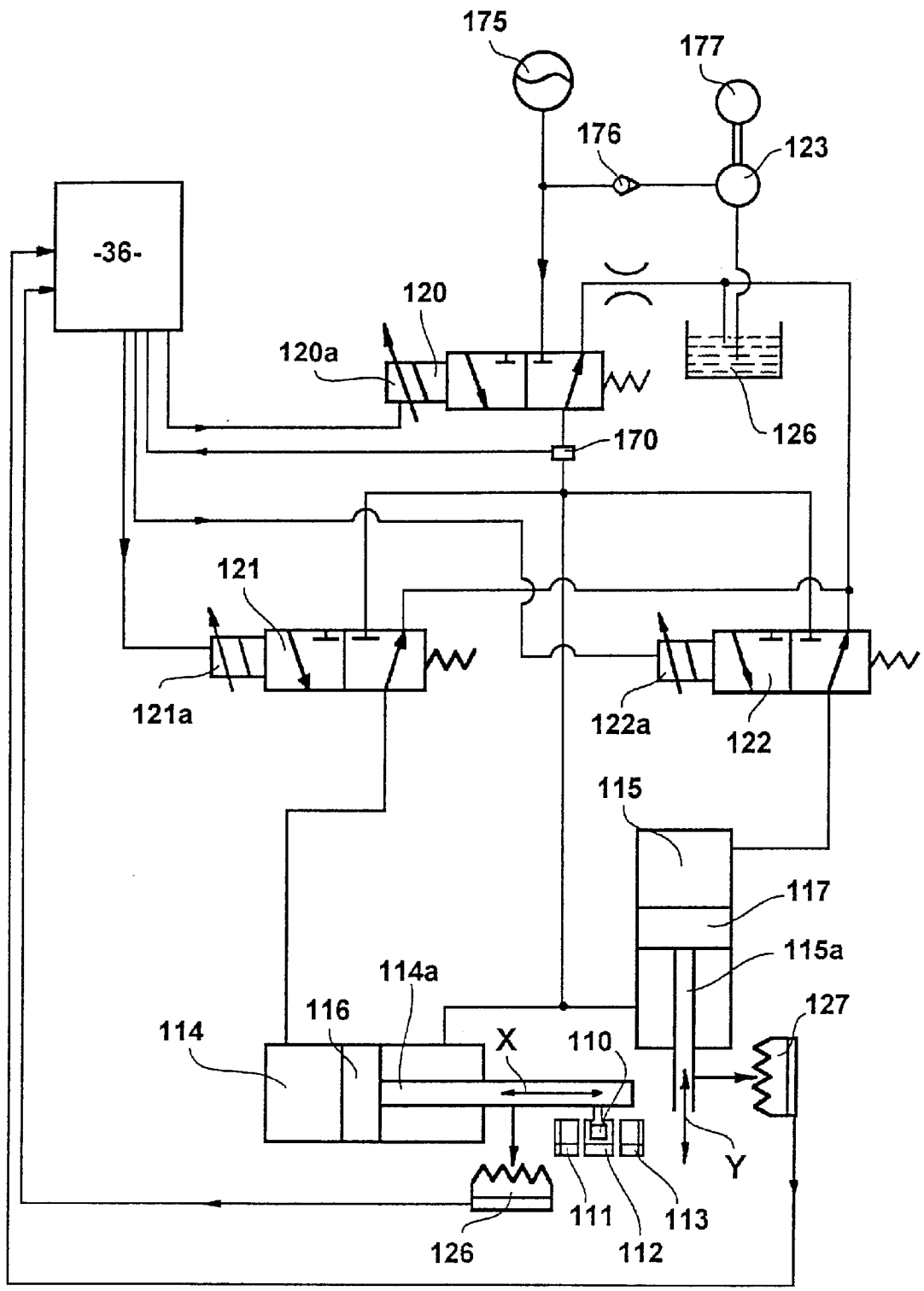
FIG. 2 illustrates the gear-engaging mechanism of the transmission system illustrated in FIG. 1.
Figure 3:
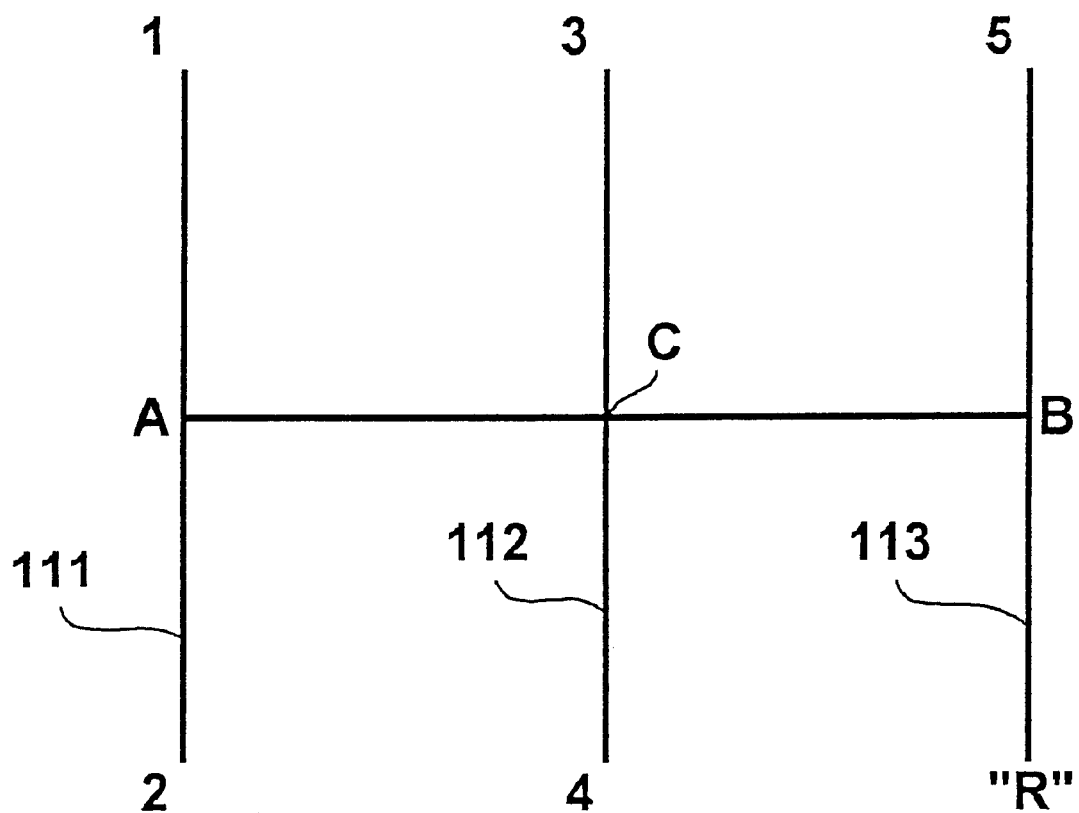
FIG. 3 illustrates the shift track pattern of the transmission used in the transmission system illustrated in FIG. 1.

As illustrated in FIG. 2, the gear-engaging mechanism 25 comprises a selector member 110 which is engageable with three shift rails 111, 112, and 113 that are movable axially to engage gear ratios of the transmission 15. As illustrated in FIG. 3, shift rail 111 engages first and second gear ratios; shift rail 112 engages third and fourth gear ratios; and shift rail 113 engages fifth gear ratio and reverse gear.

The selector member 110 is movable in a first direction X, by means of a first fluid pressure-operated actuator 114, along the neutral plane A-B of the shift pattern illustrated in FIG. 3, to align the selector member 110 with one of the shift rails 111, 112 or 113 and thereby select the pair of gears associated with that selector rail. The selector member 110 may then be moved in a second direction Y by means of a second fluid pressure-operated actuator 115, to move the shift rail 111, 112 or 113 axially in either direction, to engage one of the gear ratios associated therewith.

The actuators 114 and 115 each comprise a double acting cylinder with an actuator rod 114a, 115a, respectively, that is operatively connected with the selector member 110. The actuator rod 114a extends from one side of a piston 116 of actuator 114, so that the effective piston surface is smaller on the rod side of the piston 116 than on the opposite side, also referred to as the head side. Similarly for actuator 115, an actuator rod 115a extends from one side of a piston 117, so that the effective piston surface is smaller on the rod side of the piston 117 than on the head side. In view of the surface area differentials between opposite sides of pistons 116 and 117, if both sides are subjected to the same fluid pressure, the pistons 116 and 117 will be displaced along the actuators 114 and 115 respectively, causing the associated actuator rods 114a and 115a to move outward in relation to their respective cylinders. If however, the head sides of the pistons 116 and 117 are connected to a drain while the rod end sides are connected to a fluid pressure source, the pressure differential across the pistons 116 and 117 will cause them to be displaced along the actuators 114 and 115 respectively, to retract the associated operating, rods 114a and 115a.

The supply of hydraulic fluid to the rod and head sides of pistons 116 and 117, is controlled by three solenoid-operated valves 120, 121 and 122. Valve 120 is a master proportional flow-control valve which connects the rod end sides of pistons 116 and 117 and the proportional flow valves 121 and 122, to pressurize fluid from a hydraulic pressure source comprising a pump 123 and a pressure reservoir 175; or to drain to a reservoir 126. Similarly, the valves 121 and 122 may connect the head side of pistons 116 and 117 to the main control valve 120 or to reservoir 126 for draining. A pressure transducer 170 is provided in the line between the master control valve 120 and the valves 121 and 122 and the rod sides of pistons 116 and 117.

The proportional flow valves 120, 121 and 122 are controlled by the electronic control unit 36 to apply appropriate amounts of pressure to the opposite sides of the pistons 116 and 117 to control movement of the pistons 116 and 117 and the associated actuator rods 114a and 115a, to select and engage the required gear ratio, as disclosed in WO97/05410.

Potentiometers 126 and 127 are connected to the actuator rods 114a and 115a respectively, to provide a signal indicative of the position of the respective actuator rod. The signals from the potentiometers 126 and 127 are fed to the control unit 36 to provide an indication of the position of the actuator rods 114a and 115a for each of the gear ratios of the transmission and also to indicate the position of the actuator rod 115a, when the selector member 110 is in the neutral plane A-B of FIG. 3. The transmission system may thus be calibrated, so that predetermined position signals from potentiometers 126 and 127 correspond to engagement of each of the gear ratios of the transmission 15.

The measurements from potentiometers 126 and 127 may then be used by a closed-loop control system, to control valves 120, 121 and 122 to move the actuator rods 114a and 115a to the predetermined positions to engage the desired gear ratio.

If one or both of the potentiometers fail and produce a position signal outside the band of position signals normally produced by movement of the selector member 110 through its range of movement, then the presence of a failure is made evident and the failure may be registered by the control unit 36 and operation of the automatic transmission inhibited.

If however a failure occurs in one or both potentiometers 126 and 127, causing the potentiometer to produce a false signal within the normal range of movement of the actuators 114 and 115, then it is possible that using the closed-loop control circuit described above, a wrong gear could be engaged.

If the vehicle is in motion the potentiometers 126 and 127 may be checked by comparing the actual signals from potentiometers 126 and 127 against the predetermined position signals for the gear engaged. The gear engaged may be determined by comparing the engine speed with the vehicle speed, when there is no slippage of clutch 14. If the actual potentiometer signals do not correspond to the predetermined position signals for the gear engaged, a failure may be registered by the control unit 36 which may then be used to disable operation of the automated transmission system when the vehicle is next started.

If however a "within range" failure occurs while the vehicle is standing still, there is no means of checking the potentiometers 126 and 127 and in extreme conditions the closed loop control circuit described above may cause, for example, the reverse gear to be engaged rather than first gear. If this is permitted to happen, then starting of the vehicle in reverse rather than first gear may result in an accident.

In accordance with the present invention when the vehicle is started from stand-still, the control of the selector member 110 to engage the required start-up gear is performed by an open-loop control circuit, the valves 120, 121 and 122 being controlled to drive the actuators 114 and 115 in the directions appropriate to the start-up gear required, irrespective of the position signals indicated by potentiometers 126 and 127. As illustrated in FIG. 3, the start-up gears, i.e., first, second and reverse "R" are located at the ends of the range of movement of the selector member 110 in the neutral plane A-B. Normally, when not in operation, the selector member 110 is parked at position C.

When start-up from stand-still is initiated by moving the gear lever 24 from the neutral position "N" to the drive position "S", the control unit 36 actuates valves 120, 121 and 122 for a predetermined time period, in order to drive the piston 116 towards the head end of actuator 114, while maintaining the actuator 115 in a fixed position. The movement of piston 116 will thereby retract the actuator rod 114a causing the selector member 110 to move from position C to position A along the neutral plane A-B. At position A, where the selector member 110 is at the end of its movement range in that direction, the selector member 110 will be aligned with selector rail 111 . The control unit 36 may then actuate control valves 120, 121 and 122 for a predetermined period to cause the piston 117 to retract the actuator rod 115 thereby causing the selector rail 111 to be displaced to engage first gear. The valves 120, 121 and 122 are controlled by control unit 36 in the manner disclosed in WO97/05410 to effect the required movement of pistons 116 and 117.

Following engagement of first gear, the actual position signals from potentiometers 126 and 127 may then be compared to the predetermined position signals for first gear. If the actual position signals agree with the predetermined signals, then there is no potentiometer failure and start-up from stand-still can proceed. If however the actual position signal from potentiometer 126 is different from the predetermined position signal for first gear, potentiometer 126 is deemed to be at fault, a failure is registered by control unit 36 and start-up from stand-still is inhibited. If the actual position signal from potentiometer 127 is different from the predetermined signal for first gear, then the control unit 36 will repeat actuating the valves 120, 121 and 122 to address the actuator 115, thereby moving shift rail 111 to make several attempts to engage first gear in case blockage of the gear is preventing the selector member 110 from reaching the position in which first gear is engaged. only if the difference between actual and predetermined position signals persists over several cycles is potentiometer 127 deemed to be defective; a failure is registered by the control unit 36, and start-up from stand-still is inhibited.

In similar manner, if start-up from stand-still is required in reverse gear "R", the control unit 36 will actuate valves 120, 121 and 122 for predetermined time periods to extend actuator rod 114a, to move the selector member 110 from position C to position B, and then extend actuator rod 115a to engage reverse gear.

Preferably, in order to avoid damage to the components of the selector mechanism, the pressure differentials applied across the actuators 114 and 115 will be reduced in comparison to the normal operating pressures, so that they are sufficient to overcome spring loading and detent forces of the mechanism, but will not damage the mechanism when the latter reaches the end of a travel range of the shifting track.

By using a control system in the manner disclosed above, the potentiometers 126 and 127 may be checked, even though the vehicle is standing still, thereby avoiding the potentially hazardous situation where reverse gear may be engaged rather than first gear or vice versa.

Various modifications may be made without departing from the invention. For example, while in the above embodiments hydraulic actuators are used, hydraulic, pneumatic or electric actuators, for example electric motors or solenoids may be used, for example as disclosed in DE1 9504847; WO97/10456 or DE19734023, the contents of which are hereby expressly incorporated by reference in the present disclosure.

Where electric motors are used to move the shift member 110 the energizing current may be reduced when operating in open-loop control mode, in order to avoid damage to the selector mechanism.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. An automated transmission system for a motor vehicle with a transmission having a plurality of gear ratios and a gear-engaging mechanism, the gear-engaging mechanism comprising a selector member, a first actuator, and a second actuator, the first actuator being operable to move the selector member in a first direction and thereby select a gear ratio, the second actuator being operable to move the selector member in a second direction and thereby engage the selected gear ratio, each actuator having a position-sensing means to provide a position signal indicative of a position of the selector member and thus of the gear ratio engaged, the transmission having forward and reverse start-up gears in which the motor vehicle may be started from stand-still, the positions of the selector member at which the start-up gears are selected being end positions of a range of movement of the selector member; the transmission system comprising control means to automatically select a start-up gear to start the motor vehicle from stand-still, the control means being configured such that, at start-up from stand-still of the vehicle, the control means will drive the first actuator towards an end position of a first actuator movement range in a direction corresponding to the selector-member position of the selected start-up gear and further, the control means will drive the second actuator within a second actuator movement range in a direction corresponding to the engagement of the selected start-up gear, wherein the control means is configured such that, when a start-up gear has been selected, the control means will compare actual position signals delivered by the position sensing means to predetermined position data and, if a discrepancy is found between the actual position signals and the predetermined position data, the control means will inhibit start-up from stand-still.

2. The automated transmission system according to claim 1, wherein the control means is configured such that, at start-up from stand-still, the control means will drive the first and second actuators for a predetermined time period towards end positions of their respective movement ranges in a direction corresponding to the selected start-up gear.

3. The automated transmission system according to claim 1, wherein the range of movement of the selector member in the first direction has a first end position corresponding to the first and second gear ratios and a second end position located at the opposite end of said range of movement and corresponding to reverse gear.

4. The automated transmission system according to claim 1, wherein in the event of said discrepancy, the control means will register a failure condition.

5. The automated transmission system according to claim 1, wherein, if said discrepancy concerns the actual position signals and the predetermined position data relative to the second direction, the control means will make further attempts to engage the selected start-up gear and will continue to inhibit start-up from stand-still if said discrepancy persists.

6. The automated transmission system according to claim 1, wherein the position-sensing means comprises a potentiometer.

7. The automated transmission system according to claim 1, wherein the control means comprises a closed-loop control system and wherein further the control means is configured such that, once the vehicle is in motion, the control means will control engagement and disengagement of the gear ratios by using feedback coming from the position-sensing means through the closed-loop control system.

8. The automated transmission system according to claim 7, wherein the control means is further configured such that, once the vehicle is in motion, the control means will perform a comparison between engine speed and vehicle speed and thereby determine which of the gear ratios is engaged and, furthermore, the control means will register a failure condition if a discrepancy is found between the actual position signals and predetermined position data for the gear ratio engaged.

9. The automated transmission system according to claim 7, wherein the control means is configured such that, if a position sensor generates a position signal which is out of the normal range of movement of the selector mechanism, the control means will register a failure condition.

10. The automated transmission system according to claim 7, wherein the control means is configured such that it will inhibit the vehicle from starting up from stand-still if the control means has registered a failure condition.

11. The automated transmission system according to claim 1, wherein the actuators are pneumatic or hydraulic actuators.

12. The automated transmission system according to claim 1, wherein the control means is configured such that during start-up from stand-still, the control means will reduce pressure supplied to the actuators in order to avoid damage to the selector member.

13. The automated transmission system according to claim 1, wherein the actuators are electric motors.

14. The automated transmission system according to claim 13, wherein the control means is configured such that during start-up from stand-still, the control means will reduce the energizing current to the electric motors in order to avoid damage to the selector member.

* * * * *

UNITED STATES PATENT AND TRADEMARK OFFICE
CERTIFICATE OF CORRECTION

PATENT NO. : 6,446,522 B1
DATED : September 10, 2002
INVENTOR(S) : Robin J. Warren et al.

It is certified that error appears in the above-identified patent and that said Letters Patent is hereby corrected as shown below:

<u>Title page,</u>
Item [75], Inventors, delete "Anthony Lethbridge" and substitute
-- Antony Lethbridge --

Signed and Sealed this

Eighth Day of July, 2003

JAMES E. ROGAN
*Director of the United States Patent and Trademark Office*